United States Patent [19]
McClain

[11] Patent Number: 5,633,995
[45] Date of Patent: May 27, 1997

[54] CAMERA SYSTEM AND METHODS FOR EXTRACTING 3D MODEL OF VIEWED OBJECT

[75] Inventor: Richard A. McClain, Turnersville, N.J.

[73] Assignee: Martin Marietta Corporation

[21] Appl. No.: 618,075

[22] Filed: Mar. 18, 1996

Related U.S. Application Data

[63] Continuation of Ser. No. 717,766, Jun. 19, 1991, abandoned.
[51] Int. Cl.⁶ .................................................. G06T 17/00
[52] U.S. Cl. ........................................... 395/119; 395/120
[58] Field of Search ................................... 395/119, 120, 395/125, 162, 126, 127, 133, 141; 364/DIG. 2, 474.05, 413.13–413.22

[56] References Cited

U.S. PATENT DOCUMENTS

4,839,824  6/1989  Ando ............................. 364/DIG. 2
5,018,065  5/1991  McWhirter ..................... 364/DIG. 2

*Primary Examiner*—Almis R. Jankus
*Attorney, Agent, or Firm*—W. H. Meise; G. H. Krauss; S. A. Young

[57] ABSTRACT

A system for extracting a three-dimensional model of an object viewed in a selected scene, includes at least one camera for acquiring scene information, each from a different spatial-temporal aspect of the total scene. A digitizer converts the scene video and directional information to digital data, for at least temporary storage in a mass memory associated with a computer for data processing. An interactive display provides a means by which a human operator can view the stored scene information and select at least one scene object for which the computer will extract a 3D model, for subsequent use by a designated output device.

20 Claims, 5 Drawing Sheets

CAMERA SYSTEM AND METHODS FOR EXTRACTING 3D MODEL OF VIEWED OBJECT

This is a continuation of application Ser. No. 07/717,766, filed Jun. 19, 1991 now abandoned.

BACKGROUND OF THE INVENTION

This invention relates to vision systems and, more particularly, to a novel system and methods for extracting a 3D model of an object present in a plurality of views, from at least one camera, and describable by geometric polyhedrons subject to constrained nonlinear optimization.

It has been the objective of considerable work in the art to develop and implement a complete system with which a human user can reconstruct the 3-dimensional geometry of a scene from images. Emphasis has been placed on the development of a practical, robust interactive system in which the operator guides the object selection process and the system computer provides an optimal numerical result. Although there are many factors (e.g. surface reflectance, texture, lighting and the like) that determine how a scene will appear in an image, the most directly exploitable factor is the projective geometric relationship between scene points and image points. It is highly desirable to allow the human operator to perform the high level perceptual functions of surmising the general layout of the scene and designating the locations of scene features, functions for which a human is extremely adept, and have the computer provide the optimization to recover the scene geometry of maximum likelihood. Measurements made by the human operator are considered to be noisy observations, as image resolution will limit the accuracy to which image measurements can be made. The projective relationship is described by the equations of the camera model. The recovery of camera model parameters (camera positions, orientations, and focal lengths) will necessarily be part of the process of reconstructing the scene, as this information is normally unavailable or unreliable a priori.

Besides image measurements, the other primary means of reconstructing scene geometry will be through the specification of model geometric constraints. Common constraints arising in man-made structures are perpendicularity and parallelism. Constraints due to the polygonal mesh scheme used to model surfaces must also be taken into consideration in the solution process. It is also desirable to include a provision for constraints, to provide a means for solving what otherwise would be an underspecified problem, due to insufficient information visible in the images. Also, constraints are a means for allowing a human operator to use the system by exercising control over the models generated by the system. The system must be established ('programmed') to guard against constraint-conflict problems, especially with a human operator in the loop.

PRIOR ART

Many other forms of prior scene reconstruction methods have been developed within the field of photogrammetry, which is defined, in *The Manual of Photogrammetry*, as "the science or art of obtaining reliable measurements by means of photographs." It is known that one of the fundamental problems of photogrammetry is the camera modeling problem: for a given photograph, determine a mathematical model which describes how the image was formed, i.e. how points in the three-dimensional scene are projected onto a sensor film. In photogrammetry, the scene model is normally a set of 3-D points. The basic measurements which are provided from which to determine the camera model are: 1) the 2-D image coordinates of a set of relevant 3-D points; 2) the 3-D coordinates of some of these points, which are called control points; and 3) auxiliary data such as known camera parameters (such as focal length, pixel spacing in the image sensor, and the like). The control point positions are obtained from geodetic surveys or from topographic maps. The procedure to estimate the positions of all 3-D points as well as all the parameters of the camera model is to apply the principle of maximum likelihood. All measurements (image coordinates, control point positions, measured camera parameters) are assumed to contain a random error component, modeled with the normal distribution. The estimate for the 3-D point positions and camera parameters is that which corresponds to the most likely set of random errors. Finding this solution requires finding a least squares solution to a set of nonlinear equations. It is desirable to provide a system and method to extend the photogrammetry method to a more general and complex scene model.

A single view of a scene, being a two-dimensional projection of a three-dimensional scene, does not usually provide enough information to uniquely reconstruct the scene geometry. The situations with multiple views are much better, even if the viewpoints of the cameras are unknown. In computer vision, the reconstruction problem from multiple views has been called the structure-from-motion problem. Here, the scene is modeled as a collection of 3-D points which undergo rigid body motion. Multiple views of the scene are acquired at different times. Because of the rigid body assumption, the information collected is equivalent to having multiple simultaneous views of a stationary scene. The structure-from-motion problem very closely parallels the photogrammetry problem, with the major difference being that in structure-from-motion, nothing is assumed to be known about the scene (i.e. there are no control points). One of the major concerns in structure-from-motion has been determining the conditions under which a structure problem is solvable. The other major concern in structure-from-motion problems is the development of methods for recovering structure. But, as noted in the May 1989 special issue on visual motion in Vol. 11, No. 5 of the "IEEE Transactions on Pattern Analysis and Machine Intelligence", solution techniques have hitherto been ad hoc, i.e. not founded on sound principles of estimation theory. Also noted was the fact that the structure-from-motion problem is ill-conditioned and requires precise location of points in the images. Solutions are difficult to obtain, especially given just two perspective views of a small number of points. It is therefore desirable to remove these types of problems from the scene reconstruction techniques of the present invention, preferably by the inclusion of geometric constraints.

One version of the reconstruction problem which has received considerable attention is the extraction of solid models from orthographic views, i.e. from engineering drawings. Sutherland implemented a system where a user would indicate 3-D point position on a large digitizing table by designating the point in two perpendicular, orthographic views with a digitizing pen. The calibration of the view with respect to a single coordinate frame required designating "exemplary" points, i.e. known control points. The 3-D point data was then used to build up a polyhedral model. This system is based on a three step calibrate-measure-model procedure. Step one is to calibrate the views using known control points. Step two is to use corresponding points in multiple views to measure 3-D point positions from the stereo view-ray intersections. Step three is to use the 3-D point data to build the 3-D model of the object. This procedure surrenders accuracy because estimates made at each stage are not updated given further measurements and introduction of constraints at later stages. This loss of accuracy may be adequate when working with engineering drawings, but is perhaps inadequate for lower resolution imagery with less than perfectly defined edges. It is desirable to progress beyond this "open loop" approach, as by use of the single overall optimization techniques of the present invention.

Markowsky and Wesley have described in detail their implementation of the third stage of the calibrate-measure-model process. They use a "fleshing" algorithm to reconstruct polyhedral objects from at least two projections of the wireframe of the object. The topology of the object is automatically discovered by searching for all possible topologies that could generate the given projections. However, the algorithm was based on the assumption that the directions of the parallel projections (camera models) are known, and that the projections are extracted without measurement errors.

Another approach to scene reconstruction is an "open loop" approach based on parameterized models. One example is the SRI Cartographic Modeling Environment, which allows the user to interactively manipulate the shape and placement of a 3-D model within the overall 3-D scene model so that the projection of the model aligns with an object in the image. The 3-D models are generally simple in that they have only a few parameters available for manipulation, although with models such as the superquadric, fairly complex shapes can be obtained. The major limitation with this approach is that a human operator cannot effectively adjust all the variables to align the model with more than a single view, hence multiple views do not add precision to the models. Camera parameters computed prior to model extraction are not improved as models are generated. If models fail to align properly in multiple views, one view is selected as the "correct" view, and all others are adjusted to minimize inconsistencies.

Constraint-based solid modeling as a mechanical design tool has been a focus of research for several years at the MIT Computer Aided Design Lab. In the first system developed, a part would be designed through the two-step process of defining the topology of the part using a boundary representation and then using three-dimensional constraints to position characteristic points of the part. Given this definition of a part, changes, could be made in the dimensions of constraints, and the effect on the total part would be found using Newton's method to resolve the constraint equations. This basic technique of working with a set of constraint equations was refined by applying graph matching algorithms to match constraint equations to variables. The matching created a tree-like graph which simplified calculations because variables could be solved for sequentially, except for variables contained within loops in the graph (called "strong components") which would still require simultaneous solution.

This whole approach to part design presented several problems, probably the most serious being the difficulty of providing a sufficient set of constraints to constrain a part uniquely without overspecifying the system or generating an inconsistent set of constraints. It is desirable to avoid these problems, to the greatest degree possible, in any new system and techniques for extraction of models from visual data, because constraints alone will not determine an object's dimensions. Primarily, observations from images will determine dimensions. Constraints will not have to totally specify the objects, therefore avoiding inconsistent constraints will be simpler.

Various investigations have been conducted of automatic interpretation of line drawing images as 3-dimensional polyhedral solids. The input to these systems is a set of points on the drawing and a list of lines which connect points. The lines represent projected visible edges of a set of 3-D polyhedrons. The main contribution of the line interpretation systems is the provision of a means for establishing a correct labeling of lines, but with a major flaw in that error sources are not modeled and no advantage is taken of redundant measurements (redundant measurements are detected and then ignored).

BRIEF SUMMARY OF THE INVENTION

In accordance with the invention, a system for extracting a three-dimensional model of an object viewed in a selected scene, includes a plurality of viewing means for acquiring scene information, each from a different spatial-temporal aspect of the total scene; means for digitizing the scene information, for at least temporary storage in memory means associated with computer means for data processing; and an interface means by which a human operator can view the stored scene information and (1) designate observable vertices of the scene objects, (2) create a non-numeric structure graph representation of the scene (polygonal mesh), and (3) specify geometric constraints (point, line direction, line length and/or coincidence). The information generated by the user is placed in storage. The processing means retrieves structure graph and constraint data from storage and uses that data to synthesize a dependency graph, thereby eliminating the constraints. A set of graph unknowns is initialized to create a trial solution of the legal dependency graph. Thereafter, a maximum-likelihood optimization method, such as Gauss-Newton iteration, is used to vary the set of unknowns to improve the solution until the least error is present. The polygonal-mesh data found for the least-squares-error solution is then properly formatted and made available at a system output for subsequent use as needed.

In a presently preferred embodiment, the Gauss-Newton iteration can be replaced by a Levenberg-Marquardt iteration, to provide more robust convergence when a poor initial estimation occurs at the beginning of the optimization sequence.

Accordingly, it is an object of the present invention to provide a novel system and methods for extraction of a 3D model, from stored scene information, for an object viewable in the stored scene.

This and other objects of the present invention will now become apparent to those skilled in the art, upon reading the following detailed description of a presently preferred embodiment, when considered in conjunction with the associated drawings.

DETAILED DESCRIPTION OF THE INVENTION

Figure 1:
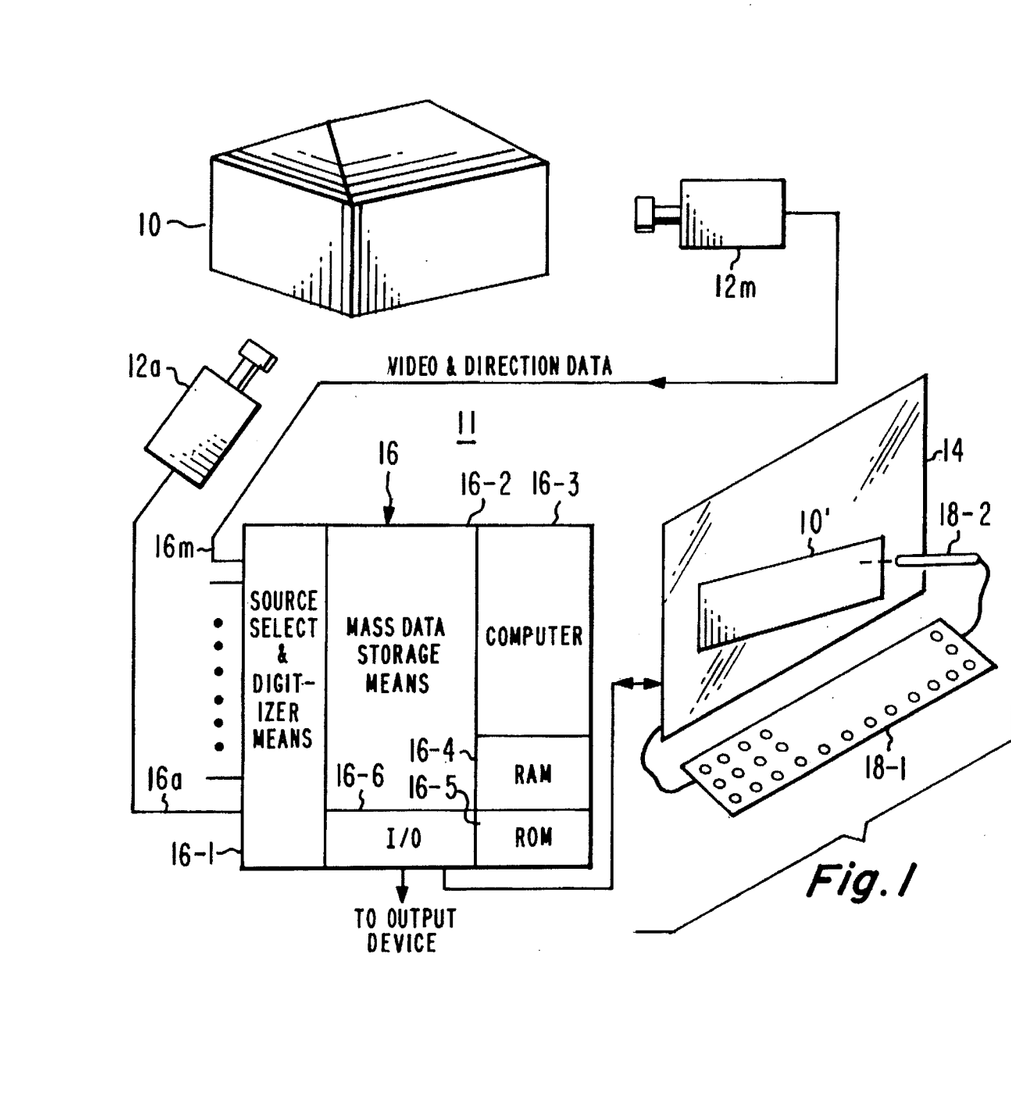
FIG. 1 is a schematic block diagram of a computer vision system, in accordance with the invention, for extracting a 3D model of an object from scene information.

Referring initially to FIG. 1, a model of an object 10 is to be acquired by a system 11, having at least one camera means 12. The particular object, in a set of a plurality of objects viewable in any one scene, is selected by a human operator (not shown) interfacing with the system via a viewing means 14. The system needs data obtained by viewing the scene from a plurality of temporal-spatial locations, i.e. either a plurality of cameras view the scene at the same time from different directions, or data is gathered from the scene over a period of time as the scenic objects move, translationally and or rotationally, past a single camera. Preferably, a plurality m of camera means 12a, ....12m are used, with the video output of, and pointing-direction information from, each camera being provided to a separate associated input 16a, ...,16m of a source selection and digitizer means 16-1 of the system signal processing electronics means 16. Advantageously, means 16-1 includes source selection multiplexers, analog video-to-digital data conversion means and the like, as well known to the art. The digital data converted from each camera is separately stored in a mass data storage memory means 16-2, under control of a data-processing system computer means 16-3, which may include a dedicated constrained least-squares computational processor as known to the art (perhaps as in U.S. Pat. No. 5,018,065, and the like). The computer includes random-access memory (RAM) means 16-4 for temporary working storage, and read-only memory (ROM) means 16-5, in which at least a portion of the operational program for means 16-3 (or all of means 16) may be stored. Selection of the portion(s) or segment(s) of the program, or operation, can be made via an operator interface keyboard 18-1 and/or a light pen 18-2 and the like I/O devices. Advantageously, the operator uses the light pen 18-2 to select a point on display 14 which determines the particular displayed object 10' to be extracted from the scenic totality. The digital data characterizing the extracted object can be used to display a graphic representation of the extracted object on means 14, if desired, and can also be made available at a system I/O means 16-6 for coupling to an output device (display, plotter, numerically-controlled machining means and the like) which may use the data to provide an object replica and the like, end uses.

Figures 1A, 1B:
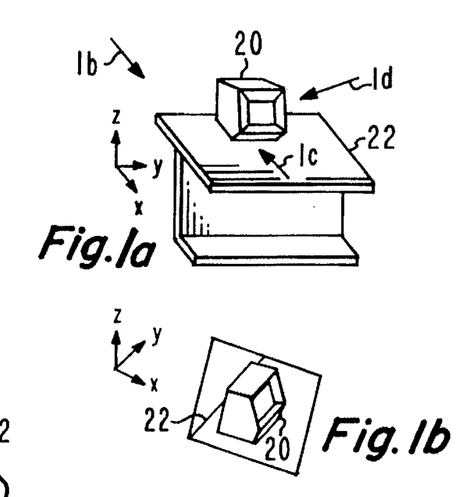
FIGS. 1a–1d are, respectively, a perspective view of a scene, and several 2D views of the 3D scene, illustrating a portion of the problem.
Figures 1C, 1D:
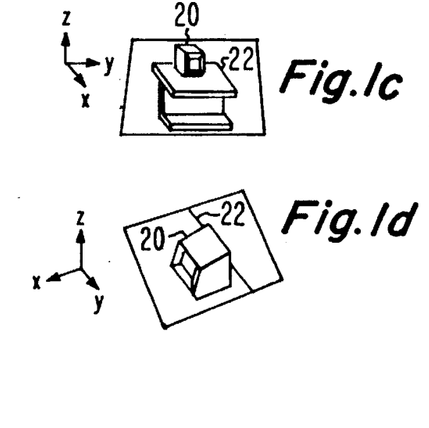

As seen in FIG. 1a, the plurality of spatial-temporal aspects can be acquired as a number of views of a scene are taken, either simultaneously from several different directions, or in time sequence as the scene objects move (translationally and/or rotationally) past the camera(s). Here, a first object 20 is resting upon a surface of a second object 22, while three different camera means observe the objects from the directions of view arrow 1b, 1c and 1d, respectively. The scene information available from the individual camera means are shown in view FIGS. 1b–1d, along with a representation of the 3D vectors of Cartesian-coordinate space for the direction data associated with that view.

Preliminary Scene Reconstruction Considerations

In accordance with one aspect of the present invention, scene reconstruction is formulated as a maximum-likelihood-estimation problem, which can be solved with a constrained, nonlinear least-squares optimization. My scene reconstruction formulation is somewhat parallel to the photogrammetric approach, but with a considerably more general scene model in which a plurality of m different images each view parts of the scene to be modeled from different vantage points. The positions and focal lengths of the camera means 12a–12m may be unknown. The problem is to recover the scene geometry from the positions of features in the stored images, each containing a scene model holding some number of objects. The position of each object is represented by a coordinate frame consisting of a rotation matrix and translation vector. Objects themselves are modeled as a constrained polygonal mesh, consisting of vertices, lines and planar faces. The polygonal mesh represents the visible side of object surfaces. Each object consists of a number n of vertices $\bar{v}_i$, where i=1, ... ,n (i.e. each vertex is represented as a 3-D vector). Each face of an object is defined by a sequence of vertices clockwise around the face when viewed from the visible side. Lines connect adjacent vertices on the boundary of a face. Constraints can be placed on line directions or face normals by use of direction vectors.

The information describing the relationships of all the geometric entities is stored in a scene structure graph, which is a list of objects; the objects themselves contain lists of vertices, faces, and lines; faces contain lists of vertices and lines; etc. The structure graph is the topological description of the scene.

The parameters which instantiate the topology into completely specified models are the scene parameters. Each geometric entity in the model is defined by some number of parameters, which may, for convenience, exceed the minimum number of parameters or degrees of freedom (DOF) needed to specify the entity. Each of a plurality n of vertices, as noted above, is defined by a 3D vector $\bar{v}_i$, for $1 \leq i \leq n$. Lines are defined by a line direction vector $\bar{a}$ and a vector offset $\bar{o}$. Points $\bar{x}$ lie on the line if the equation $\bar{x}=k\bar{a}+\bar{o}$ is satisfied for some scalar k. Faces are defined by a face normal vector $\bar{a}$ and any point on the plane by a vector $\bar{p}$. Points satisfying $\bar{a}\cdot(\bar{x}-\bar{p})=0$ lie on the plane. Determination of the scene variables (the totality of all scene parameters together) is the crux of the reconstruction problem.

Scene Geometric Constraints

In accordance with another aspect of my invention, constraints are placed upon scene geometry. Constraints implicitly arise from the definition of an object model as a planar mesh, because all vertices in a face must lie in the plane of the face. This implicit constraint is, expressed by the vector equation $\bar{a}\cdot(\bar{x}-\bar{p})=0$ for each vertex in a face.

Additional, explicit constraints on the scene geometry may be needed; explicit, operator-determined constraints will be necessary in those situations where the camera model and scene geometry are underspecified. For example, constraints may be used to fill in parts of a scene not viewed in any image. Explicit constraints may also be provided because the human user in the display-control-and-definition loop will often desire to force scene models to satisfy particular conditions (e.g. verticality of walls and the like). My presently preferred embodiment of method and system provides for use of any one, or a combination, of four types of constraints: 1) point constraint—the user directly specifies the coordinates of a vertex of any scene object; 2) direction constraint—line directions or face normals are constrained to lie along a particular direction, which can be either fixed or left free to vary; 3) length constraint—the length of a line is fixedly established; and 4) coincidence constraint—a vertex, line or face of a selected object is constrained to be coincident with another vertex, line, or face, generally of another object in the same scene.

Figure 2:
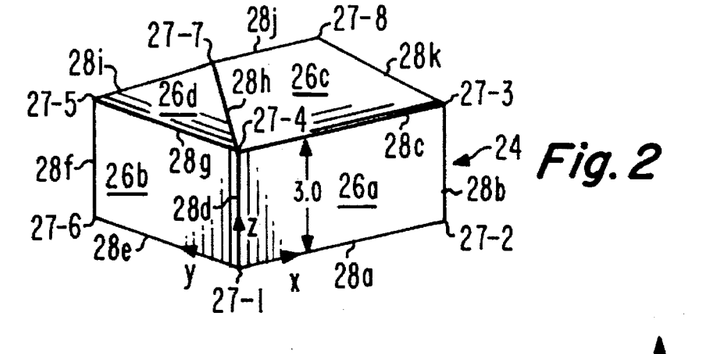
FIG. 2 is a view of a simple object, considered as an example in illustrating the present invention.

Referring now to FIG. 2, an illustration of the use of explicit constraints is shown. A simple house facade model 24 consisting of four polygons 26a–26d, defined by eight vertices 27-1 through 27-8 and lines 28a–28k therebetween. A constraint file "object house" can be constructed to describe the topology; such a constraint file for this simple model, using vertices 1–8 and faces defined by clockwise-arranged vertex sets, might be:

```
object house                  :Comments-
{   vertices 8                :sets #
    face 1 4 3 2              :name
    face 1 6 5 4              :each
    face 4 5 7                :face
    face 4 7 8 3              :in set
    constraint point 0 0 0    :origin=
       vertex 1               :here
    constraint direction 1 0 0  :X-axis=
       line 1 2               :this line
    constraint direction 0 1 0  :Y-axis=
       line 1 6               :this line
    constraint direction 0 0 1  :Z-axis=
       line 1 4               :this line
       line 6 5               :in Z dir.
       line 2 3               :in Z dir.
    constraint length 3.0     :set line
       line 1 4               :length
}
```

The constraints force the wall edges to be vertical and establish a coordinate frame attached to the house, at vertex 27-1 (i.e. vertex number 1). In my current system, the user generates the constraint file via the graphical user interface 14, without the necessity for typing the file into the system.

My system methodology operates on a scene with multiple objects by causing the user to select one of the object coordinate frames as the base frame for the overall scene. The computer means then determines the position of all other object frames relative to the base frame. In landscape situations where maps of a geographic area are available, the user may wish to have the scene defined with respect to a geocentric or local observer frame defined at a nearby point in the "world". The user simply creates a "world" object with a set of vertices corresponding to known points in the world. The known vertex positions are entered as point constraints, within the object's coordinate system. By selecting the "world" object frame as the base frame (and designating the positions of these control points in the images), the solutional method will then output result data for all other objects with respect to the "world" frame. The user can work within a world frame if a map is available, or within a local frame attached to one object if nothing but the images is available, all without modifying the solutional program in means 16. Without control points, however, the user must enter at least one length constraint to provide scale.

The graphical user interface can be a workstation-based unit enabling the user to conveniently create the informational input to the scene geometry solver. This type of interface allows the user to designate, via some movable means (a mouse, a light pen and the like), the positions of at least one selected vertex in the images displayed on the workstation screen (acting as means 16). The user can then directly enter the topology information by selecting sequences of vertices to define each polygonal face of the model. Constraints are similarly input by use of pull-down menus and the user directly indicating particular features in the scene structure by selecting, with the movable selection means, designated vertices on the display screen.

In accordance with another principle of my invention, the object-extraction problem is formulated by collecting all of the parameters associated with all the geometric entities in the scene into only one k-dimensional vector $\bar{x}$ which represents the scene model. Constraints on the scene model are expressed by at least one nonlinear equation, and typically a plurality of such nonlinear equations, all which can be collected into one vector equation: $\bar{h}(\bar{x})=0$.

The positions of the vertices can be extracted from the scene parameter vector $\bar{x}$. Let the position of the i-th vertex be denoted by the vector $\bar{v}_i(x)$. These 3D points are viewed, in the aforementioned plurality of spatial-temporal aspects, by one or more cameras. The remaining variables in the system are the unknown camera parameters $\bar{c}_j$, for $1 \leq j \leq m$ cameras. The predicted image position of the i-th vertex in the j-th image is obtained from the camera parameters by applying a 3D to 2D camera projection function, $\bar{p}(\bar{v}_i, \bar{c}_j)$. The form of this function will depend on the type of camera used (frame, panoramic, etc.).

For some combinations of vertex and image, an observation of the vertex in the image will be available. The observed 2D position of vertex i in image j will be denoted, $\bar{i}^o_{ij}$, and treated as a noisy observation with standard deviation $\sigma_{ij}$ in both the horizontal and vertical directions. The set of ij pairs for which an observation is available will be denoted by the set D. For some vertices, a direct observation of its 3D position may be available, generally from a map or blueprint. The observed 3D position of the i-th vertex will be denoted $\bar{v}^o_i$ having standard deviation $\sigma_i$ in each of x, y and z. The set of individual (i), for each of which a 3D control point is available, will be noted by the set C.

I obtain the vector $\bar{g}^o$ by concatenating all the observations $\bar{i}^o_{ij}$, for ij$\in$D, and $\bar{v}^o_i$, for i$\in$C. The likelihood function is the probability of observing the observations given the unknowns to be estimated. Assuming zero mean, independent, Gaussian random errors, the likelihood function $p(\bar{g}^o|\bar{x}, \bar{c}_1, \ldots, \bar{c}_m)$ is:

$$p(\bar{g}^o|\bar{x}, \bar{c}_1, \ldots, \bar{c}_m) = \qquad (1)$$

$$\left\{ \prod_{ij \in D} \frac{1}{(2\pi)^{1/2}\sigma_{ij}} \exp\left[-\frac{1}{2}\left|\frac{\bar{i}^o_{ij} - \bar{p}(\bar{v}_i(x), \bar{c}_j)}{\sigma_{ij}}\right|^2\right] \right\}$$

$$\left\{ \prod_{i \in C} \frac{1}{(2\pi)^{1/2}\sigma_i} \exp\left[-\frac{1}{2}\left|\frac{\bar{v}^o_i - \bar{v}_i(x)}{\sigma_i}\right|^2\right] \right\}.$$

I have found that the scene variables and camera parameters which satisfy the constraints and maximize the likelihood function is equivalent to the following optimization:

Minimize (2)

$$f(\bar{x}, \bar{c}_1, \ldots, \bar{c}_m) = \sum_{ij \in D}\left|\frac{\bar{i}^o_{ij} - \bar{p}(\bar{v}_i(x), \bar{c}_j)}{\sigma_{ij}}\right|^2 + \sum_{i \in C}\left|\frac{\bar{v}^o_i - \bar{v}_i(x)}{\sigma_i}\right|^2$$

subject to $h(x) = \theta$

This formulation combines all observations and known constraints into a single overall optimization that obtains the scene geometry and camera models corresponding to the most likely set of noise samples.

Those skilled in the art will now appreciate that the optimization described by equations (1) and (2) can be approached in various ways. The method of my invention, as shown in the flow graph of FIG. 3, first retrieves the image data from storage and, in step 30, displays the image data for the user. The user selects at least one vertex of the desired object to be extracted from the scene and, interfacing via the workstation I presently use for means 16, interactively inputs, in step 32, the scene topology data and then inputs, in step 34, data for any observed vertices found in initial processing. In step 36, the initial data is displayed for prompting the user to input constraint information. Then all of the available data is used, in step 38, to convert the constrained optimization to an unconstrained optimization by eliminating constraints simultaneous with a reduction in the number of unknowns. Parameters are grouped into constrained geometric elements with dependencies between elements recorded in an acyclic dependency graph, configured in step 40, and more fully described hereinbelow in solution section A. This dependency graph expresses the polygonal mesh as a kind of kinematic structure, where each variable (degree of freedom, or DOF) is similar to a joint. The process also checks on the consistency of constraints, because inconsistent constraints preclude an acyclic graph. The existence of a dependency graph also guarantees that the combination of constraints and observations is sufficient to uniquely specify the scenic system.

Figure 3:
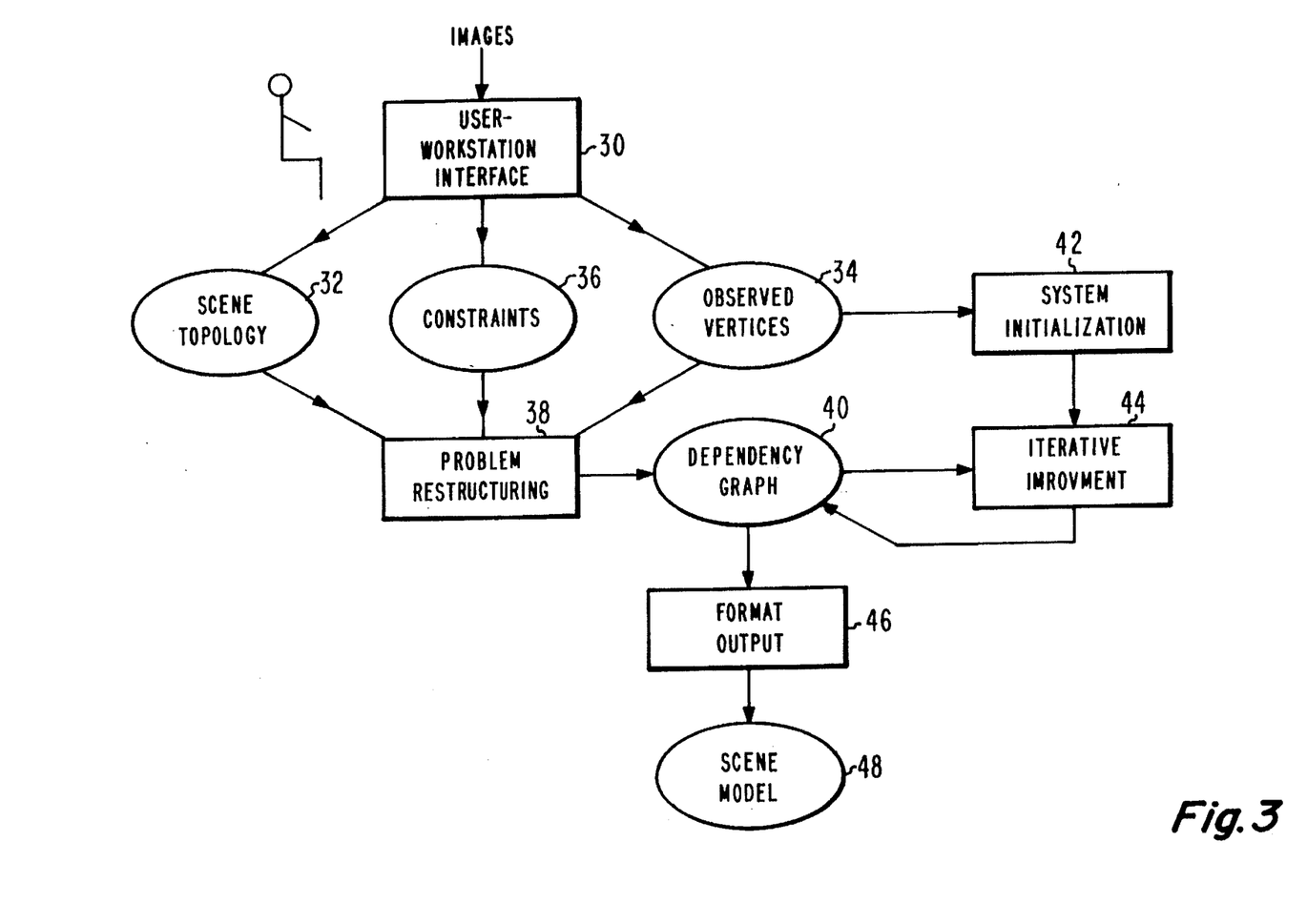
FIG. 3 is a flow graph illustrating the overall methodology of the present invention.

Once a legal dependency graph has been created, the system proceeds toward a solution by first, in step 42, initializing all the unknowns in a bootstrap procedure described in greater detail hereinbelow in section B. The final solution is obtained in step 44, using a Gauss-Newton iteration to improve the dependency graph, as described in section C infra. The data for the final dependency graph is then properly formatted in step 46, in accordance with a preselected format standard, and the formatted data is output, in step 48, to user-selected output devices (e.g. the display means, a plotter, a numerically-controlled machine and the like) for subsequent usage as desired.

Section A: Constraint Elimination

Figure 4:
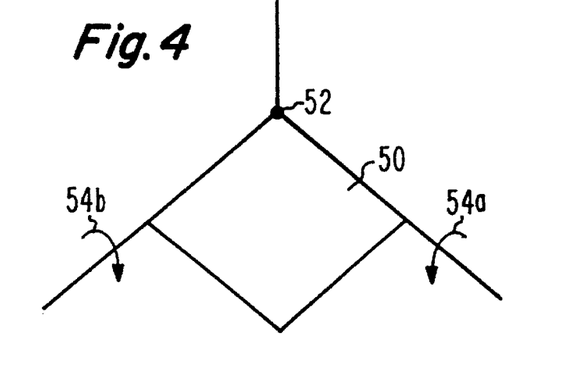
FIG. 4 is a 3D representation of one face of an object to be extracted by the method of the present invention, and illustrating several conventions used therewith.

In my novel method, constraints are eliminated, in the problem restructuring step 46, by grouping the unknowns associated with the geometry into subsets associated with the basic geometric entities of the model: coordinate frames, vertex points, lines, face planes, and direction vectors. The constraints (point, direction, length, coincidence) each define a relationship between two elements. For example, if a face contains a vertex, then the face plane and the vertex point must intersect. To eliminate this coincidence constraint, the symmetry is broken and one of the elements is placed as a constraint on the other. In the face/vertex example, either the face is free and the vertex must lie in the plane of the face, or the vertex is free and the face must intersect the vertex. The constrained element has reduced degrees of freedom (fewer variables) due to the constraint. Continuing the example and referring to its illustration in FIG. 4, if the face is constrained by the vertex, then the face is no longer represented by a 3-DOF free plane but by a 2-DOF plane 50 which is attached to a fixed point 52 in space, with DOF vectors 54a and 54b. In effect, the constraint disappears from the overall system and is submerged into the constrained geometric element.

As discussed briefly hereinabove, eliminating all constraints requires finding an acyclic graph, called a dependency graph, which defines an evaluation ordering of all elements. The ordering is such that if one element is dependent on other elements, then that one element must appear later in the evaluation ordering than all of the elements it depends on. In addition, individual geometric elements must not be overconstrained. For example, a plane cannot be constrained by four points. The allowable types of constrained geometric elements are listed in the following Table:

TABLE

Geometric Elements Associated with Nodes in the Dependency Graph

| ID | Description | DOF |
| --- | --- | --- |
| Camera | Camera | 7 or more |
| Frame | Free object frame | 6 |
| Frame 1D | Object frame constrained by direction | 4 |
| Frame 1P | Object frame constrained by point | 3 |
| Frame 1D1P | Object frame constrained by direction and point | 1 |
| D | Free direction | 0 or 2 |
| D1L | Direction constrained by 1 line | 0 |
| D1F | Direction constrained by 1 face | 0 |
| D1D | Direction orthogonal to another direction | 1 |
| P | Point | 0 |
| P1V | Point constrained by 1 vertex | 0 |
| V | Free Vertex | 3 |
| V1P | Vertex constrained by a point | 0 |
| VLength | Vertex constrained by a line length | 0 |
| V1L | Vertex constrained by 1 line | 1 |
| V2L | Vertex constrained by 2 lines | 0 |
| V1F | Vertex constrained by 1 face | 2 |
| V1F1L | Vertex constrained by 1 face and 1 line | 0 |
| V2F | Vertex constrained by 2 faces | 1 |
| V3F | Vertex constrained by 3 faces | 0 |
| V1V | Vertex constrained by 1 vertex | 0 |
| F | Free Face | 3 |
| F1D | Face constrained by direction | 1 |
| F1D1V | Face constrained by direction and 1 vertex | 0 |
| F1D1L | Face constrained by direction and 1 line | 0 |
| F1L | Face constrained by 1 line | 1 |
| F2L | Face constrained by 2 lines | 0 |
| F1V | Face constrained by 1 vertex | 2 |
| F1V1L | Face constrained by 1 vertex and 1 line | 0 |
| F2V | Face constrained by 2 vertices | 1 |
| F3V | Face constrained by 3 vertices | 0 |
| F1F | Face constrained by 1 face | 0 |
| L | Free Line | 4 |
| L1D | Line constrained by direction | 2 |
| L1D1V | Line constrained by direction and 1 vertex | 0 |
| L1V | Line constrained by 1 vertex | 2 |
| L2V | Line constrained by 2 vertex | 0 |
| L1F | Line constrained by 1 face | 2 |
| L1F1V | Line constrained by 1 face and 1 vertex | 1 |
| L2F | Line constrained by 2 faces | 0 |
| L1L | Line constrained by 1 line | 0 |

When generating the dependency graph, the assignment of node types to geometric entities is restricted to insure that during the subsequent solution process, initializing unknowns will be straightforward. For example, a vertex which is not observed in any of the images of a problem set is restricted to node types which allow the position of the vertex to be deduced solely from its predecessor nodes in the graph (Vertex constrained by 2 lines, Vertex constrained by 1 face and 1 line, etc.). If a single view of a vertex is available, then labels are less restricted because the view ray can be used to help initialize the vertex. Given two views of a vertex, no restrictions are needed because even if the vertex is unconstrained, it can be initialized using view ray intersection (stereo). Similar restrictions are placed on line and face node labels.

These extra restrictions, which are referred to as "initiability" conditions, as used in step 40, basically insure that each element is completely specified. Satisfaction of these conditions guarantees that the system of equations being solved will not be singular due to some part of a model's structure being underspecified. Dependency graphs satisfying these conditions are also expected to produce better conditioned problems than graphs which do not, although this has not been proven.

Figure 5:
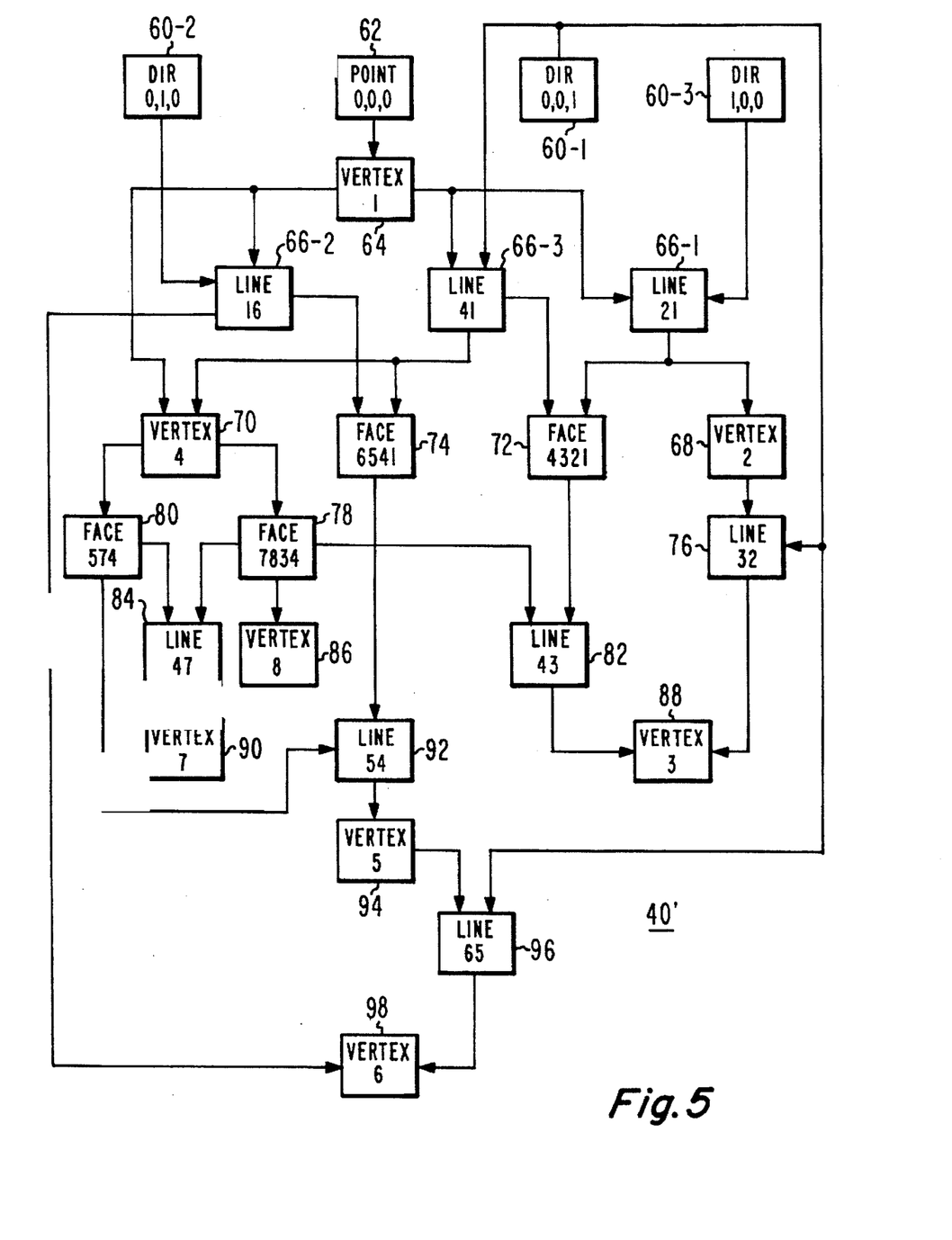
FIG. 5 is a dependency graph for the building shown in FIG. 2.
Figure 6A:
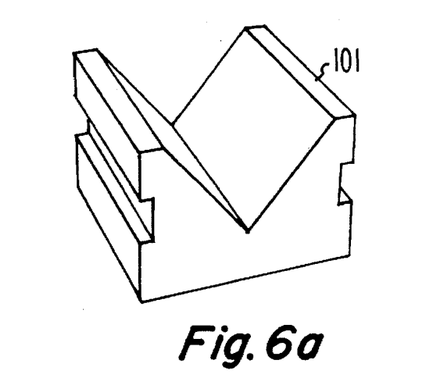
FIGS. 6a–6d are examples of various 3D models extracted by use of the present invention.
Figure 6B:
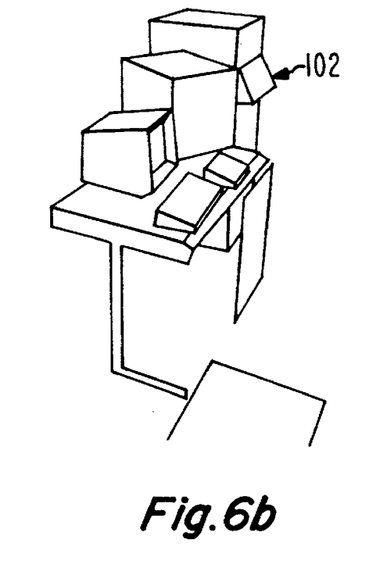
Figure 6C:
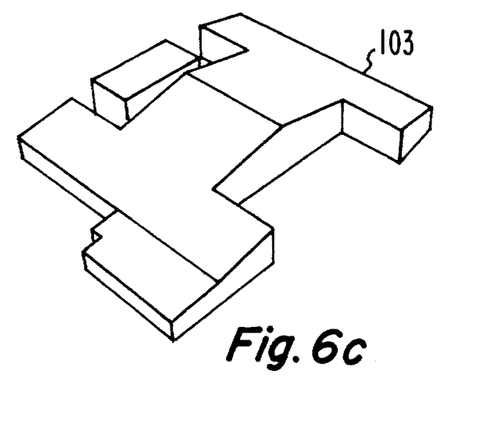
Figure 6D:
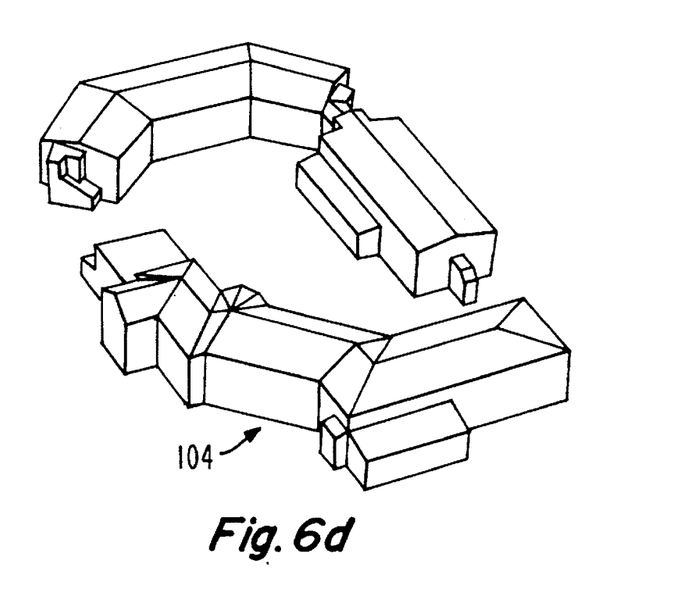

Referring now to FIG. 5, a dependency graph 40' is illustrated for the building facade 24 of FIG. 2, as constrained after reduction of the set of constraints specified in the "object house" constraint file, supra. Thus, a first graph row has input elements: the initial conditions specify the three Cartesian coordinate axes in graph elements 60-1 through 60-3; and the object frame origin in graph element 62. After these minimum spatial definitions are set, the other constraints are used in the second 'line' of activity, to set the first vertex 27-1 at the origin (in graph element 64). Having now set this a priori condition for specifying lines, the second graph line of activity defines, in respective graph elements 66-1, 66-2 and 66-3, the directions of a first line (from point 1 at vertex 27-1 to point 2 at vertex 27-1) along the X axis, a second line (from point 1 to point 6 at vertex 27-6) along the Y axis, and a third line (from point 1 to point 4 at vertex 27-4) along the Z axis. The end points of the lines 12, 14 and 16 can now considered; the previous data can be used to define points 2 or 4, respectively at vertices 27-2 or 27-4, in graph element 68 or 70 of the fourth graph row. Because the specification of point 1 and lines 12 and 14 determine face 1234, just as face 6541 is determined by point 1 and lines 14 and 16, the fourth graph row also includes graph elements 72 and 74. Line 23 can now be found and placed in graph element 76 of row 5; in this particular dependency graph, row 5 also contains the graph elements 78 and 80 respectively for face and face 3478. This set of given and calculated constraints leads to the specification of line 43 (in element 82), line 4,7 (in element 84) and vertex 8 (in element 86) of the sixth graph row. Thereafter, the seventh row includes solutions for vertices 3 and 7 (in respective elements 88 and 90) and for line 54 (in element 92), while subsequent eighth, ninth and tenth (final) graphs rows respectively include respective elements 94, 96 and 98, which respectively specify vertex 5, line 65 and vertex 6. The entire model is now established for the object (building) having a selected point (vertex 1) included on its periphery.

Acyclic Dependency Graph Search Algorithm

The dependency graph is 'written' by the graph search algorithm of my novel method. The inputs to the graph search algorithm are:

1. Scene topology (structure) graph—a graph structure provided by step 32 and including the object, face, line and vertex data structures, with links defining the connectivity between them.
2. List of constraints—each constraint (step 36 input) may define new point and direction vector geometric entities linked into the main scene structure graph.
3. Image feature location list—the measured positions in images of some but not necessarily all vertices, provided (at least in part) by the data input in step 34.

The outputs of the graph search algorithm are:

1. Dependency graph this step 40 data structure includes an assignment of one of the constrained geometric element types (from Table 1) to each of the geometric entities. Each element data structure is set up with address pointers to the elements upon which it depends.
2. Order list—a topological sort of the elements into a single list which preserves the partial ordering implied by the constraint dependencies. For an acyclic graph, a topological sort is always possible.

The graph search algorithm directly generates the order-listed topological sort of the elements by attempting to place the elements in order, one at a time. The first (presort) phase of the algorithm generates the topological sort in top-down manner, with least-dependent elements first. During the second phase, the final topological sort is generated in bottom-up, with most-dependent first. At any point during the search, the system seeks to add one more element to the order, and all elements will have been separated into two categories: those "determined" elements that appear after the next element to be placed in the graph; and those "undetermined" elements that appear before the next element to be placed.

During both phases of the algorithm, the system relies on "checkStatus" functions, associated with each of the types of geometric entities (face, line, vertex, frame, point, and direction vector). These functions are specialists at understanding the legal constraint relationships associated with each geometric entity. When a checkStatus function is invoked in the middle of the search, it is passed an address pointer to a particular instance of the associated geometric entity. The actions taken by these functions are:

1. Detect which connecting elements are constraining (according to the current state of the order list).
2. Ignore constraining elements whose constraints are subsumed by other elements. Example: a face's checkStatus function will ignore a constraining vertex if a line coincident with it is also constraining.
3. Decide if element is overconstrained.
4. Decide if element is underspecified (uninitiable).
5. Identify the element type if neither over- or underconstrained, by returning one of the type codes in the above Table.

The purpose of the initial top-down phase of the search is to establish global ordering information by determining the minimum depth in the dependency graph of each element. To accomplish this, a topological sort is generated, but elements are allowed to be overconstrained. The network is generated from top to bottom.

Top-Down Phase

```
Initially, set all elements as undetermined (nothing
constrains them), and depth = 0.
do {
    For each undetermined element
        Call elements checkStatus function;
        If the element is constrained (ie. not underspecified)
            then record the current depth in elements
            data structure;
    Set all constrained elements to determined;
    depth = depth + 1;
} while (some elements became determined);
```

If any elements remain undetermined then stop and report underconstrained elements.

The purpose of the final bottom-up phase is to generate the final ordering of the elements, making sure that all constraints are compatible, and that no element is either over- or underconstrained. In this phase, the dependency graph, or network, is generated from the bottom up. The trial selection of elements is based on the depth number computed in the top-down phase.

Bottom-Up Phase

```
Initially, set all elements determined.
do {
    e = least-constrained, deepest, determined element;
    If e is overconstrained
        then stop and report overconstrained elements;
    Else if e is underconstrained
        then normalize current ordering
            and do exhaustive search for compatible ordering;
    Else place e in next in the order list and make it
    undetermined;
        Call checkStatus function of all determined elements
                                          connected to e;
} while (elements left to be ordered);
```

After constraint elimination, the problem can be restated, in terms of the original nonlinear programming problem, as the placement of the parameters of the scene model, previously described by the k-dimensional vector $\bar{x}$, into groups, where each group corresponds to a geometric entity of the scene (face, line, vertex, object orientation, etc.). A parameter group j is a function of the parameters of the elements on which it depends and on a (possibly null) set of free variables, $\bar{y}_j$.

Concatenating all the free variables $\bar{y}_j$, where $j=1,\ldots,n$, creates a single free variable vector y, of dimension N equal to the number of degrees of freedom of the scene. All parameters of the geometric entities can be computed from the free variable vector $\bar{x}=\bar{x}(\bar{y})$, and $\bar{x}$ is guaranteed to satisfy the constraint equations (1) and (2) for all $\bar{y}$. The vertex positions are therefore functions of $\bar{y}$, as is the function to be minimized. The optimization (1) and (2) is now equivalent to:

$$\text{Minimize } f(\bar{y}, \bar{c}_1, \ldots, \bar{c}_m) = \sum_{ij \in D} \left| \frac{\bar{t}_{ij}^o - \bar{p}(\bar{v}_i(\bar{x}(\bar{y})), \bar{c}_j)}{\sigma_{ij}} \right|^2 + \sum_{i \in C} \left| \frac{\bar{v}_i^o - \bar{v}_i^p(\bar{x}(\bar{y}))}{\sigma_i} \right|^2 \quad (3)$$

This optimization is unconstrained, and can be restated in somewhat more general terms by: concatenating all unknowns into one vector $\bar{z}$; concatenating all modeled observations into one vector function $\bar{g}(\bar{z})$; concatenating all observation measurements into one vector $\bar{g}^o$; and combining the standard deviations of observation errors into a diagonal weight matrix, $\overline{W}=\text{diag}(1/\sigma_i)$. Then, the optimization becomes:

$$\begin{aligned} \text{Minimize } f(\bar{z}) &= \sum \left( \frac{g_i(\bar{z}) - g^o}{\sigma_i} \right)^2 \\ &= |\overline{W}(\bar{g}(\bar{z}) - \bar{g}^o)|^2 . \end{aligned} \quad (4)$$

B. Initial Approximation of System Solution

The development of a robust procedure for use in step 40 to automatically generate an approximate solution to equation (4) is aided by the organization of the dependency graph. Considerable effort has gone into the development of a procedure to bootstrap from whatever a priori information is available (constraints plus measured vertex positions) to obtain initial estimates of unknown camera and scene parameters. No single procedure is capable of performing this initialization because it is highly dependent on what a priori or constraint information is available. Consequently, it is important to have several approaches, which are automatically drawn upon if they are applicable. The main difficulty is in estimating initial camera orientation. Algorithms are provided which could use any available control points, or direction constraints, or simply corresponding vertices between cameras to generate initial estimates that are usually accurate enough to allow convergence of the subsequent iteration.

The overall procedure for initializing the independent variables of the graph will be briefly summarized; once the camera models are approximated, the polygonal mesh is simple to initialize because each element is guaranteed to be initializable by the constraint elimination algorithm.

Summary of Initialization Procedure

1. Unless already known, assume cameras located at infinity (c=0)
2. Initialize orientation, translation, and scale of cameras (if possible) using any "knowns" visible to the cameras:
   lines in known directions
   control points
3. Use stereo to approximate vertex locations (ignore constraints).
4. If some cameras are still unknown, go back to step 2.
5. Call each elements initialization procedure in an order such that all elements it depends on will be called first (always possible for an acyclic graph, which can be topologically sorted).

C. Iterative Improvement to Final Solution

I have implemented step 42 by use of a Gauss-Newton iterative method for solving equation (4); this is the same as finding the least-squared-error solution to $$\overline{W}\bar{g}(\bar{z})=\overline{W}\bar{g}^o.$$

These nonlinear equations are solved using the Gauss-Newton method, which iteratively improves an approximate solution $\bar{z}_n$. Each iteration of Gauss-Newton's method consists of:

Step 1: Compute Jacobian matrix, $\bar{g}'(\bar{z}_n)=\partial\bar{g}/\partial\bar{z}$, which provides a linearized system of equations, substantially valid in the neighborhood of the $\bar{z}_n$.

$$\overline{W}\bar{g}(\bar{z}_{n+1})=\overline{W}\bar{g}(\bar{z}_n)+\overline{W}\bar{g}'(\bar{z}_n)\bar{d}_n=\overline{W}\bar{g}. \quad (5)$$

Step 2: Solve the linearized system for the least-squared-error differential change, using the pseudoinverse (note that a simple adjustment to the $\bar{g}'^T\overline{W}^2\bar{g}$ matrix in this step converts the Gauss-Newton algorithm to the Levenberg-Marquardt (LM) algorithm. The LM modification has a more robust convergence when used with a poor initial estimate, but in many cases takes significantly more steps to converge):

$$\overline{W}\bar{d}_n=-(\overline{W}\bar{g}(\bar{z}_n))\dagger\overline{W}(\bar{g}(\bar{z}_n)-\bar{g}^o).$$

The pseudoinverse $\bar{A}\dagger$ of matrix $\bar{A}$ is computed using:

$$\bar{A}\dagger=(\bar{A}^T\bar{A})^{-1}\bar{A}^T.$$

Step 3: Apply the differential change to $\bar{z}_n$:

$\bar{z}_{n+1} = \bar{z}_n + \bar{d}_n$.

Actually, the sum found in step 3 only makes sense for certain $\bar{z}$ vector components, such as scalar camera parameters and point coordinates. Camera positions and much of the geometry, however, are represented by homogeneous transforms and to apply a differential change, $[dp_x\ dp_y\ dp_z\ d\phi_x\ d\phi_y\ d\phi_z]^T$, to a transform, the change itself is converted into a homogeneous transform:

$$\overline{\text{Diff}} = \text{Trans}(dp_x, dp_y, dp_z) \text{Rot}(d\phi_x, d\phi_y, d\phi_z)$$

which then multiplies the original transform:

$$\overline{C}_{n+1} = \overline{C + ee}_n + \text{e,ovs Diff} \tag{15}$$

This technique for handling differential changes to a transform in the context of the Gauss-Newton procedure was previously described by Lowe.

Gauss-Newton's method converges to a local minimum mean squares error solution of $\overline{Wg(z)} = \overline{Wg}^o$. The procedure described in previous section B provides an accurate enough starting point to allow convergence in most cases. For the times when the initial guess is not close enough (and convergence is not obtained), one may want to implement an additional solve mode, which is set to essentially use only the minimum model constraints needed to establish a base reference coordinate system, and simply computes camera models allowing the 3D points to float freely in space. A subsequent overall solve step then converges in all cases where a solution is well defined.

In my procedure, the computation of partial derivatives for the Jacobian begins with the camera model equations, which are derived hereinbelow in Appendix B. The camera model equations relate the image position vector $\bar{i}$, to the vector position of a world point $\bar{x}^w$, depending on the value of the camera vector parameters $\bar{f}$, $\bar{R}$ and $\bar{p}$.

$$\bar{i} = \begin{bmatrix} g \\ h \end{bmatrix} = \begin{bmatrix} a_u & 0 \\ 0 & a_v \end{bmatrix} \begin{bmatrix} \frac{sx}{1-cz} \\ \frac{sy}{1-cz} \end{bmatrix} + \begin{bmatrix} b_u \\ b_v \end{bmatrix} \tag{6}$$

where $$\begin{bmatrix} x \\ y \\ z \end{bmatrix} = \bar{x}^c = \bar{R}\bar{x}^w + \bar{p} \quad \bar{f} = \begin{bmatrix} s \\ c \end{bmatrix} \tag{6a}$$

The point $\bar{x}^c$ is the position of the point relative to the camera coordinate frame. A free parameter $\lambda$ of the model affects the sensor position through its effect on the variables $\bar{x}^c$ and $\bar{f}$. Hence, the evaluation of the partial derivatives of sensor coordinates with respect to the free parameter $\lambda$, will proceed along the lines of $$\frac{\partial \bar{i}}{\partial \lambda} = \frac{\partial \bar{i}}{\partial \bar{x}^c} \left( \frac{\partial \bar{x}^c}{\partial \bar{x}^w} \frac{\partial \bar{x}^w}{\partial \lambda} + \frac{\partial \bar{x}^c}{\partial \bar{C}} \frac{\partial \bar{C}}{\partial \lambda} \right) + \frac{\partial \bar{i}}{\partial \bar{f}} \frac{\partial \bar{f}}{\partial \lambda} \tag{7}$$

In this equation, $\bar{x}^w$ refers to the world coordinates of the point, and $\bar{C}$ refers to the position of the camera coordinate frame. This equation (7) shows that the free parameter affects sensor position by its effect on the 3D camera coordinates of the point and by its effect on the internal camera parameters (focal length and scale in the initial implementation). Normally, a free parameter will affect either point coordinates or camera parameters and the other term drops out.

The two terms grouped in parenthesis in equation (7) indicate that the free parameter affects the camera coordinates of the point by either (1) its effect on the points position in the world, $\bar{x}^w$, or (2) its effect on the position of the camera with respect to the world. The evaluation of this last term requires concepts covered in Appendix C (relating to partial derivatives with respect to coordinate frames).

Several of the terms in equation (7) can be derived simply from equation (6):

$$\frac{\partial \bar{i}}{\partial \bar{x}^c} = \begin{bmatrix} \frac{\partial g}{\partial x} & \frac{\partial g}{\partial y} & \frac{\partial g}{\partial z} \\ \frac{\partial h}{\partial x} & \frac{\partial h}{\partial y} & \frac{\partial h}{\partial z} \end{bmatrix} \tag{7a}$$

$$= \begin{bmatrix} a_u & 0 \\ 0 & a_v \end{bmatrix} \begin{bmatrix} \frac{s}{1-cz} & 0 & \frac{scx}{(1-cz)^2} \\ 0 & \frac{s}{1-cz} & \frac{scy}{(1-cz)^2} \end{bmatrix},$$

$$\frac{\partial \bar{x}^c}{\partial \bar{x}^w} = \bar{R},$$

$$\frac{\partial \bar{i}}{\partial \bar{f}} = \begin{bmatrix} a_u & 0 \\ 0 & a_v \end{bmatrix} \begin{bmatrix} \frac{x}{1-cz} & \frac{sxz}{(1-cz)^2} \\ \frac{y}{1-cz} & \frac{syz}{(1-cz)^2} \end{bmatrix}.$$

Appendix C contains a derivation of the partial derivative of a point with respect to its base frame (which will be equation (12)):

$$\frac{\partial \bar{x}^c}{\partial \bar{C}} = \begin{bmatrix} 1 & 0 & 0 & 0 & z & -y \\ 0 & 1 & 0 & -z & 0 & x \\ 0 & 0 & 1 & y & -x & 0 \end{bmatrix}. \tag{7b}$$

The terms $\partial \bar{C}/\partial \lambda$ and $\partial \bar{f}/\partial \lambda$ evaluate to null vectors unless the free parameter is one of the camera parameters, in which case one element of one of the vectors is unity.

The one term in equation (7) that is not easily written is $\partial \bar{x}^w/\partial \lambda$, giving the effect of the free parameter on the position of the vertex. Due to the chaining of elements in the dependency graph, a single free parameter can affect the positions of many vertices. In order to develop an automatic procedure for computing the overall Jacobian matrix, a small chain rule procedure is implemented for each of the 41 geometric elements in the above Table, which computes the partial derivative of the element with respect to an arbitrary free parameter in terms of the partial derivatives of all the terms it depends on. For example, for the face constrained by 1 vertex, the face is represented by a coordinate frame, $\bar{F}$, and the vertex is represented by its world coordinate vector, $\bar{v}$. Due to the constraint, $$\bar{F} = \begin{bmatrix} \bar{R} & \bar{v} \\ 0\ 0\ 0 & 1 \end{bmatrix}. \tag{7c}$$

Given $\partial \bar{v}/\partial \lambda$, we can compute $\partial \bar{F}/\partial \lambda$ by following the procedure outlined in Appendix C:

$$\overline{\text{Diff}}(\lambda) = \bar{F}(\lambda_0)^{-1}\bar{F}(\lambda) \tag{7d}$$

$$= \begin{bmatrix} \bar{R}^T & -\bar{R}^T\bar{v}(\lambda_0) \\ 0\ 0\ 0 & 1 \end{bmatrix} \begin{bmatrix} \bar{R} & \bar{v}(\lambda) \\ 0\ 0\ 0 & 1 \end{bmatrix}$$

$$= \begin{bmatrix} \bar{I} & \bar{R}^T(\bar{v}(\lambda) - \bar{v}(\lambda_0)) \\ 0\ 0\ 0 & 1 \end{bmatrix}.$$

Hence, using equation (8) in Appendix C, $\bar{\delta}(\lambda)=\theta$ and $\bar{d}(\lambda) = \bar{R}^T(\bar{v}(\lambda) - \bar{v}(\lambda_0))$. Applying equation (13) in Appendix C:

$$\frac{\partial \overline{F}}{\partial \lambda} = \left[ \begin{array}{c} \overline{R}^T \frac{\partial \overline{v}}{\partial \lambda} \\ 0 \end{array} \right]. \quad (7e)$$

This result is simple and easily written. Some of the other 40 cases are not so simple; however, they are all straightforward to derive.

With these chain rule procedures in place for all geometric elements, the computation of the Jacobian matrix proceeds as follows:

---
⌈ for each free parameter λ
   let q = the geometric element associated with λ
   initialize ∂q̄/∂λ (to the appropriate unit vector)
   for every element r̄ affected by q̄
⌊      compute ∂R̄/∂λ using elements chain rule procedure
---

In this procedure, in the loop where the partial derivatives of all affected elements are computed, the partial derivative functions are called in dependency order.

Referring now to FIGS. 6a–6d, several examples of objects extracted from reconstructed scenes are illustrated. The overall system used is PolyFit, a 3D model extraction system developed around the special-purpose nonlinear least-squares solver of the present invention, coupled with a user interface which allows a human user to employ the solver in an effective manner. Well over one hundred other models have so far been reconstructed, and the system is coming into routine use for building databases for the GE COMPU-SCENE® family of image generators. The imagery of the pillow-block 101 of FIG. 6a and the desk 102 scene of FIG. 6b was collected in my laboratory with a CCD video camera; two different views of the pillow block were taken, and eight different views of the desk scene were used. No additional information was used other than the images, and the initial constraints were those that a human operator easily surmised about the scene by examining the images. The building 103 of FIG. 6c was extracted from four images: one oblique view taken from a tower, a ground level handheld camera view, and two different overhead views. The building complex 104 of FIG. 6d was extracted from a total of 19 separate images. All of the views shown in FIGS. 6a–6d are hidden line wireframe renderings at viewpoints not corresponding to any of the images used to reconstruct the scene. In each of these examples, the scale of the models was specified by defining a length constraint within the scene. The base reference frame was arbitrarily attached to one of the objects in the scene. If a map which provides 3D positions of recognizable points were available, then the models could be reconstructed and scaled within a coordinate frame related to the map. These examples illustrate the wide variety of models that can be reconstructed with the system and method of the present invention.

My novel system and methods for extracting object data from scene geometry reconstructed from images, using a maximum-likelihood estimation to account for random measurement errors, has been described herein in great detail. Specifically, the maximum-likelihood scene was shown to be the solution to a constrained nonlinear least square minimization, for which a solution procedure was developed. Many modifications and variation will now occur to those skilled in the art. It is my intent to be limited only by the scope of the appending claims and not by the details and instrumentalities presented herein by way of explanation of the particular embodiment presently preferred.

Appendix A. Coordinate Frames

In the implementation of this system, extensive use is made of the homogeneous transform (rotation matrix and translation vector) which represents the position of one certainty frame with respect to another. In addition to being the representation of various geometric elements (planes, lines, directions), homogeneous transforms are used to describe the scene geometry as a two-level hierarchy, with the position of each object in the world defined by a homogeneous transform, and the internal geometry of each object defined within its own certainty frame. One reason that each object has its own coordinate frame is that constraints on the internal geometry of objects are most conveniently defined relative to a preferred-object-oriented coordinate frame. Also, having an object reference frame for each object effectively separates the internal geometry of the object from the orientation and position of the object within the scene. The system can then, for instance, take fixed object models and position them within the scene.

The following are useful ways of referring to the components of the 4×4 matrix homogeneous transform $\overline{T}$:

$$\overline{T} = \begin{bmatrix} n_x & o_x & a_x & p_x \\ n_y & o_y & a_y & p_y \\ n_z & o_z & a_z & p_z \\ 0 & 0 & 0 & 1 \end{bmatrix} = \left[ \begin{array}{cccc} \overline{n} & \overline{o} & \overline{a} & \overline{p} \\ 0 & 0 & 0 & 1 \end{array} \right] = \left[ \begin{array}{cc} \overline{R} & \overline{p} \\ 0 0 0 & 1 \end{array} \right].$$

Appendix B. Camera Models

Camera modeling schemes normally place the camera coordinate frame at either the optical focal point or the focal plane. This choice leads to two potential problems for iterative searches (which problems have been alleviated with the novel camera modeling system and methods of the present invention). The first problem arises if the camera coordinate frame is placed in proximity to where the camera is physically located. The problem is (assuming for the sake of discussion that the Z-axis is aligned with the optical axis) that the first order effect of rotations about the X-axis and translations along the Y-axis are the same: the image translates in the image Y direction. This first order equivalence is also true of rotations about the Y-axis and translations along the X-axis. The second problem is that the first-order effect of a change in focal length and a change in camera range (translation along the Z-axis) are the same whenever the camera range is many times greater than the depth of the scene; the perspective transformation reduces to orthographic projection, and the effect of both range and focal length are a change in scale. The effect of these ambiguities in rotations/translations and range/focal length is to increase the condition number of the Jacobian matrix, and gradient-based methods will hem-stitch. Each step of the iteration must be chosen to balance the large first-order effects, hence the system becomes less sensitive to the second-order effects (perspective and rotation of the points within the scene).

The first problem is avoided by choosing to represent the camera position with a coordinate frame called the local camera frame, which lies on the optical axis of the camera optics, but which is located in the proximity of the scene. This local frame will be oriented the same as the remote frame which lies at the focal center of the optics. The Z-axis of both frames is directed away from the scene (hence all points in the scene will have negative z values in the remote frame). The X-axis is directed in the direction of increasing raster lines and the Y-axis is directed in the direction of a left-to-right scan of the image. Note that rotations of this axis will have the desired effect of rotating the camera about the scene while the scene remains in view of the camera.

The second problem is avoided by formulating the perspective transformation such that the two parameters "range" and "focal length" are replaced with two new parameters "closeness" (inverse range) and "scale" (ratio of focal length to range).

Figure 7:
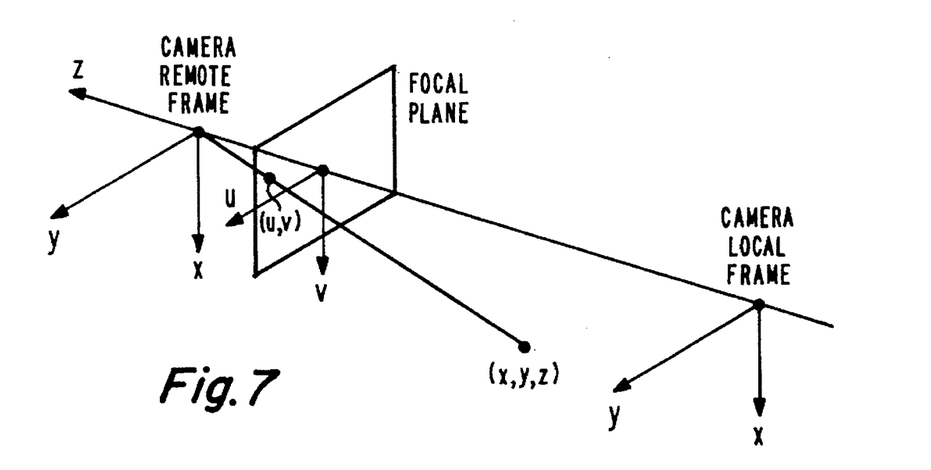
FIG. 7 is an orthographic projection model of focal and camera-local planes, and useful in understanding certain simplifying conventions used in the present invention.

As shown in FIG. 7, in a camera model which avoids both the first (remote rotations) problem and the second (special orthographic projection case) problem, a point $(x^r, y^r, z^r)$ in the remote camera frame (located at the camera focal center) is projected to the point $(u,v)$ in the focal plane (located at a distance f from the focal center), according to the perspective transformation:

$$u = -f(x^r/z^r)$$

$$v = -f(y^r/z^r)$$

To avoid the first problem in this form of the camera model, I define the position of the point with respect to a local camera frame $(x^c, y^c, z^c)$ where $(x^c, y^c) = (x^r, y^r)$, $z^c = z^r + 1/c$. The second problem is avoided by the use of a parameter 'c' to represent the inverse range from the local frame to the remote frame along the optical axis. With these substitutions, the perspective transformation becomes:

$$u = fc(x^c/(1-cz^c))$$

$$v = fc(y^c/(1-cz^c))$$

Lastly, define a scale parameter, $s=fc$, which scales distances from the local frame to the focal plane (in the absence of perspective distortion). The final result is:

$$u = s(x^c/(1-cz^c))$$

$$v = s(y^c/(1-cz^c))$$

Note that this formulation, based on closeness and scale parameters, reduces cleanly to an orthographic projection as the camera range goes to infinity, because the closeness parameter 'c' goes to a well-defined point (zero). However, note also that now there is an extra parameter, due to the fact that the position of the local coordinate frame along the optical axis is arbitrary. To handle the ambiguity associated with the extra parameter, the position of the local frame along the optical axis will be held fixed at each step of the iteration, and the position of the remote frame moved along the axis by varying the closeness parameter.

The camera model also normally includes four parameters $(a_u, b_u, a_v, b_v)$ that relate pixel position $g,h$ in the digitized image to the $u,v$ position in the focal plane. The relevant equations are:

$$g = a_u u + b_u$$

$$h = a_v v + b_v$$

The 'a' factors are sensor scale factors, in units of pixels/unit distance, and the 'b' factors are the principal point offset in pixels.

Summarizing, the camera parameters $\bar{c}$ include a homogeneous transform (rotation matrix $\bar{R}$ and translation $\bar{p}$) representing the position of the word with respect to the camera local frame, closeness c, scale s, and internal sensor parameters $a_u$, $b_u$, $a_v$, $b_v$. The camera projection function $\bar{p}$ introduced earlier is defined by:

$$\bar{i} = \begin{bmatrix} g \\ h \end{bmatrix} = \bar{p}(\bar{x}^w, \bar{c}) = \begin{bmatrix} a_u & 0 \\ 0 & a_v \end{bmatrix} \begin{bmatrix} \frac{sx}{1-cz} \\ \frac{sy}{1-cz} \end{bmatrix} + \begin{bmatrix} b_u \\ b_v \end{bmatrix}$$

where $$\begin{bmatrix} x \\ y \\ z \end{bmatrix} = \bar{x}^c = \bar{R}\bar{x}^w + \bar{p}.$$

Appendix C. Partial Derivatives

1. Partial Derivative with respect to (wrt) Coordinate Frames:

To obtain partial derivatives with respect to rotations and translations of coordinate frames, I work with differential transforms (see, e.g. *Robot Manipulators* by Richard Paul). A differential transform consists of a differential translation, represented by a vector $\bar{d} = [d_x, d_y, d_z]^T$, and a differential rotation, represented by a vector $\bar{\delta} = [\delta_x, \delta_y, \delta_z]^T$. A differential transform can be represented by stacking the translation and rotation vectors into a single 6-vector:

$$\bar{d} = [d_x, d_y, d_z, \delta_x, \delta_y, \delta_z]^T.$$

In practices, a homogeneous transform $\overline{\text{Diff}}$ is obtained from these vectors by:

$$\overline{\text{Diff}} = \text{Trans}(d_x, d_y, d_z) \text{Rot}(\delta_x, \delta_y, \delta_z). \qquad (8)$$

Here, $\text{Trans}(d_x, d_y, d_z)$ is a pure translation transform, and $\text{Rot}(\delta_x, \delta_y, \delta_z)$ is a rotation about the X-axis by $\delta_x$, followed by a rotation about the Y-axis by $\delta_y$, followed by a rotation about the Z-axis by $\delta_z$.

For small values of $\bar{d}$ and $\bar{\delta}$, the result of applying the $\overline{\text{Diff}}$ transform to a vector $\bar{x}$, can be approximated by using the vector cross product to perform the rotation:

$$\bar{x} = \overline{\text{Diff}}\bar{x}$$
$$\approx \bar{x} + \bar{\delta} \times \bar{x} + \bar{d}.$$

Hence $\overline{\text{Diff}}$ can also be expressed as $$\overline{\text{Diff}} = \begin{bmatrix} \bar{I} + [\bar{\delta}]_x & \bar{d} \\ 0 \ 0 \ 0 & 1 \end{bmatrix} \qquad (9)$$

where the notation $[\bar{\delta}]_x$ defines a mapping from a 3D vector to a 3-by-3 matrix:

$$[\bar{\delta}]_x = \begin{bmatrix} 0 & -\delta_z & \delta_y \\ \delta_z & 0 & -\delta_x \\ -\delta_y & \delta_x & 0 \end{bmatrix} \qquad (10)$$

Using this notation, the cross production of two vectors can be expressed as multiplication of a 3-by-3 matrix and a vector:

$$\bar{x} \times \bar{y} = [\bar{x}]_x \bar{y}.$$

Which expression for the differential transform is most convenient to use depends on the task at hand. If I am applying the differential transform computationally, I use the homogeneous transform expression (8), because it will preserve the orthogonality of rotation matrices. If I am analytically evaluating differentials, the cross product form (9) will usually be the most useful.

The partial derivative of some function of a coordinate frame $\overline{T}$, with respect to changes in that frame, can be found using:

$$\frac{\partial f(\overline{T})}{\partial \overline{T}} \equiv \frac{\partial f(\overline{T}\,\overline{Diff})}{\partial \overline{D}}\bigg|_{\overline{D}=0} \quad (11)$$

2. Partial Derivative of Transformed Vector wrt the Transformation:

As an example of use of equation (11), suppose I have $\overline{y}=f(\overline{T})=\overline{T}\overline{x}=\overline{R}\overline{x}+\overline{d}$. It should be noted that, in order to avoid the use of homogeneous vectors, the homogeneous transforms such as $\overline{T}$ and $\overline{Diff}$, although written as 4-by-4 matrices, are treated as operators that transform 3D-vectors into 3D-vectors by a rotation and translation. Then, making use of equation (9):

$$\begin{aligned}
f(\overline{T}\,\overline{Diff}) &= \overline{T}\,\overline{Diff}\,\overline{x} \\
&= \begin{bmatrix} \overline{R} & \overline{p} \\ 0\ 0\ 0 & 1 \end{bmatrix} \begin{bmatrix} \overline{I}+[\overline{\delta}]_\times & \overline{d} \\ 0\ 0\ 0 & 1 \end{bmatrix} \overline{x} \\
&= \overline{R}\overline{x} + \overline{R}(\overline{\delta}\times\overline{x}) + \overline{R}\overline{d} + \overline{p} \\
&= \overline{R}\overline{x} - \overline{R}[\overline{x}]_\times\overline{\delta} + \overline{R}\overline{d} + \overline{p}
\end{aligned}$$

I now apply equation (11):

$$\frac{\partial \overline{y}}{\partial \overline{T}} = \frac{\partial f(\overline{T}\,\overline{Diff})}{\partial \overline{D}}\bigg|_{\overline{D}=0} \quad (12)$$

$$= \overline{R}[\overline{I} - [\overline{x}]_\times]$$

$$= \overline{R}\begin{bmatrix} 1 & 0 & 0 & 0 & z & -y \\ 0 & 1 & 0 & -z & 0 & x \\ 0 & 0 & 1 & y & -x & 0 \end{bmatrix}$$

In equation (12), x, y and z are the coordinates of $\overline{x}$ (with respect to $\overline{T}$).

3. Partial Derivative of a Point wrt its Base Frame:

The result in equation (12) suggested to me a definition for the partial derivative $\overline{x}$ of a point, with respect to a differential change in its base transformation $\overline{T}$, given by:

$$\frac{\partial \overline{x}}{\partial \overline{T}} = \frac{\partial(\overline{Diff}\,\overline{x})}{\partial \overline{D}}\bigg|_{\overline{D}=0} \quad (13)$$

$$= \begin{bmatrix} 1 & 0 & 0 & 0 & z & -y \\ 0 & 1 & 0 & -z & 0 & x \\ 0 & 0 & 1 & y & -x & 0 \end{bmatrix}.$$

With this definition of $\partial\overline{x}/\partial\overline{T}$, equation (12) can be derived using the chain rule:

$$\frac{\partial \overline{y}}{\partial \overline{T}} = \frac{\partial \overline{y}}{\partial \overline{x}} \frac{\partial \overline{x}}{\partial \overline{T}}$$

while recognizing that $\partial\overline{y}/\partial\overline{x}=\overline{R}$, and expanding $\partial\overline{x}/\partial\overline{T}$ using equation (13).

4. Partial Derivative of Coordinate Frame wrt Free Parameter:

I assume a homogeneous transform $\overline{T}(\lambda)$, which varies as a function of a free parameter $\lambda$. To compute the partial derivative of the transform with respect to the free parameter, I expressed the changes in $\overline{T}$ in terms of a differential transform. Thus, in the neighborhood of $\lambda=\lambda_0$, the variation of $\overline{T}$ can be represented by a differential transform $\overline{Diff}(\lambda)$, as follows:

$$\overline{T}(\lambda)=\overline{T}(\lambda_0)\overline{Diff}(\lambda),$$

$$\overline{Diff}(\lambda)=\overline{T}(\lambda_0)^{-1}\overline{T}(\lambda)$$

As defined in equation (8), the differential transform $\overline{Diff}$ depends on the 6-vector $\overline{D}$. The partial derivative of the coordinate frame (ie, the transform) with respect to $\lambda$ is then defined to be:

$$\frac{\partial \overline{T}}{\partial \lambda} \equiv \frac{\partial \overline{D}}{\partial \lambda}. \quad (14)$$

In practice, the partial derivatives will often be determined by simply considering the translational and rotational effects of small changes in the free parameter. In other contexts, the partial derivatives will be determined using the chain rule.

5. Partial Derivative of Coordinate Frame wrt Coordinate Frame:

To calculate the partial derivative of one coordinate frame with respect to a second coordinate frame which is treated as a free parameter, I express the differential changes induced in the first frame by differential changes in the second frame. I let the functional relationship be $\overline{T}(\overline{A})$. First, I establish the relationship between differential changes in $\overline{A}$ on $\overline{T}$:

$$\overline{T}(\overline{A})\overline{Diff}_{\overline{T}}=\overline{T}(\overline{A}\ \overline{Diff}_{\overline{A}}). \quad (15)$$

And now the partial derivative is defined by:

$$\frac{\partial \overline{T}}{\partial \overline{A}} = \frac{\partial \overline{D}_{\overline{T}}}{\partial \overline{D}_{\overline{A}}}\bigg|_{\overline{D}_{\overline{A}}=0}. \quad (16)$$

6. Transforming Differential Transforms:

At least one formula is known for transforming a differential transform from one coordinate frame to another. The version of this formula which I have used is derived using equations (15) and (16). To do this, I compute the partial derivative of $\overline{T}=\overline{A}\ \overline{C}$ with respect to $\overline{A}$. From equation (15), I obtain:

$$\overline{A}\ \overline{C}\ \overline{Diff}_{\overline{T}+\infty}=\overline{A}\ fheightDiff_{\overline{A}}\ +e,ovs\ \overline{C}$$

From the above, I obtain the following expression for $\overline{Diff}_{\overline{T}}$:

$$\overline{Diff}_{\overline{T}}=\overline{C}^{-1}\overline{Diff}_{\overline{A}}\overline{C}.$$

Expanding, letting $\overline{C}$ be written in terms of a rotation matrix $\overline{R}$ and translation vector $\overline{p}$, gives:

$$\overline{Diff}_{\overline{T}}= \begin{bmatrix} \overline{R}^T & -\overline{R}^T\overline{p} \\ 0\ 0\ 0 & 1 \end{bmatrix} \begin{bmatrix} \overline{I}+\overline{\delta}_{\overline{A}}\times\overline{I} & \overline{d}_{\overline{A}} \\ 0\ 0\ 0 & 1 \end{bmatrix} \begin{bmatrix} \overline{R} & \overline{p} \\ 0\ 0\ 0 & 1 \end{bmatrix}$$

$$= \begin{bmatrix} \overline{I}+\overline{R}^T\overline{\delta}_{\overline{A}}\times\overline{R} & \overline{R}^T(\overline{\delta}_{\overline{A}}\times\overline{p}+\overline{d}_{\overline{A}}) \\ 0\ 0\ 0 & 1 \end{bmatrix}.$$

Using equation (9), I can equate this expression with $\overline{Diff}_T$ in terms of its differential parameters:

$$\begin{bmatrix} \bar{I} + \bar{\delta}_T \times \bar{I} & \bar{d}_T \\ 0 \ 0 \ 0 & 1 \end{bmatrix} = \begin{bmatrix} \bar{I} + \bar{R}^T \bar{\delta}_A \times \bar{R} & \bar{R}^T(\bar{\delta}_A \times \bar{p} + \bar{d}_A) \\ 0 \ 0 \ 0 & 1 \end{bmatrix}. \quad (17)$$

From the upper left partition of this matrix equality, we obtain:

$$[\bar{\delta}_T]_x = \bar{R}^T[\bar{\delta}_A]_x \bar{R} \quad (18)$$
$$= \bar{R}^T[\bar{\delta}_A] \times \bar{R}$$
$$= [\bar{R}^T \bar{\delta}_A]_x.$$

The last step required the formula:

$$\bar{R}^T[\bar{\delta}] \times \bar{R} = [\bar{R}^T \bar{\delta}]_x.$$

which is true for any orthogonal matrix $\bar{R}$. This formula can be verified by carrying out the multiplication of the three terms and simplifying. The truth of the formula can be simply recognized by considering each terms as a transformation. The transformation on the left hand side consists of a rotation followed by taking the cross product with a vector $\delta$, and then rotating the result back to the original coordinate frame. These operations are equivalent to taking the cross product with the vector $\delta$ rotated into the original coordinate frame, which is the transformation on the right hand side.

From the upper right partition of matrix equality (17):

$$\bar{d}_T = \bar{R}^T(\bar{\delta}_A \times \bar{p}) + \bar{d}_A \quad (19)$$
$$= (\bar{p} \times \bar{R})^T \bar{\delta} + \bar{d}_A.$$

The notation $\bar{p} \times \bar{R} \equiv [\bar{p}]_x \bar{R}$ (a vector crossed with a matrix) represents the matrix with each column equal to p crossed with the corresponding column of $\bar{R}$. Combining equations (18) and (19), we obtain an expression for the transformation of differential changes in $\bar{A}$ into differential changes in $\bar{T} = \bar{A}\bar{C}$:

$$\begin{bmatrix} \bar{d}_T \\ \bar{\delta}_T \end{bmatrix} = \begin{bmatrix} \bar{R}^T & (\bar{p} \times \bar{R})^T \\ \theta & \bar{R}^T \end{bmatrix} \begin{bmatrix} \bar{d}_A \\ \bar{\delta}_A \end{bmatrix}$$

Finally, applying equation (16), we obtain the partial derivative of $\bar{T}$ with respect to $\bar{A}$:

$$\frac{\partial \bar{T}}{\partial \bar{A}} = \begin{bmatrix} \bar{R}^T & (\bar{p} \times \bar{R})^T \\ \theta & \bar{R}^T \end{bmatrix}$$

What I claim is:

1. A system for generating data representative of a three-dimensional object from a plurality of views of a scene including said object, and for displaying a view of said scene, said system comprising:

camera means for generating plural views of said scene, for generating data representative of said scene;

display and selection means coupled for receiving said data representative of said scene, for generating a display of said plural views, and for receiving, and converting into data, user inputs relating to the locations of vertices associated with said object, the identification of faces of said object associated with said vertices, and geometric constraints including, where applicable, line lengths, line directions, line parallelism, and point or vertex coincidence, for thereby generating user-processed scene data, said user inputs being subject to errors so that, in said user-processed scene data, the locations of said vertices and lines may not exactly correspond among said views;

processing means coupled to said camera means and to said display and selection means, for (a) processing said user-processed scene data by means of a dependency graph to reduce the number of said geometric constraints, (b) combining all said user-processed scene data relating to parameters of said scene and object into a single vector, and forming a single likelihood function from said vector, which likelihood function includes the locations and parameters of said camera means; (c) optimizing said likelihood function to obtain optimized data representing the most likely combination of said camera, vertex and line locations and parameters; and display means coupled for receiving said optimized data, for displaying a two-dimensional representation of said three-dimensional object.

2. The system of claim 1, wherein said camera means includes means for obtaining a plurality m of substantially simultaneous different images, each of a different spatial aspect of said scene.

3. The system of claim 1, wherein said processing means is adapted to: retrieve from storage data representative of (a) topological structure, (b) constraints, and (c) vertex designation; receive information from the user selecting at least one object to establish a base object frame for the object to be extracted; create an acyclic dependency graph from a structure graph and the received constraint information; initialize unknowns in the dependency graph to form a trial solution thereof; and iteratively operating on and improving the dependency graph until a best sequentially constrained dependency graph is obtained.

4. The system of claim 3, wherein said processing means synthesizes said structure graph from the retrieved topological data.

5. The system of claim 3, wherein said processing means interacts with said display means to allow the user to select the at least one constraint from the group consisting of: vertex point, line direction, line length and coincidence of a selected one of a vertex, line or face of a first object with a selected one of a vertex, line or face of another object.

6. The system of claim 3, wherein said processing means provides to at least one object within said scene, other than said selected object, an object frame spatially situated at a location dependent upon said base object frame.

7. The system of claim 3, wherein said processing means establishes the totality of constraints as a consistent whole within a set of predetermined initability conditions.

8. The system of claim 7, wherein said processing means further limits the totality of constraints, to generate said dependency graph in the form of a single ordered list of scene elements.

9. The system of claim 8, wherein said processing means generates said single ordered element list by presorting said scene elements into a top-down sorted first network, and sorting said first network into a bottom-up sorted network of scene elements.

10. The system of claim 3, wherein said processing means performs said iterative improvement by use of a selected one of Gauss-Newton and Levenberg-Marquardt iteration algorithms.

11. A method for extracting a three-dimensional model of an object in a selected scene, comprising the steps of:

acquiring, from a plurality of spatial-temporal views, each of which spatial-temporal views is associated with a viewing site, digital data representing at least that portion of the scene containing the object to be extracted, said digital data not including information relating to the location of at least one of said viewing sites;

at least temporarily storing the acquired digital scene information data;

displaying to a system user selected scenic information to allow the user to select from the displayed data a feature of the object to be extracted;

processing a constrained least-squares optimization of at least the stored digital data for the feature selected via the display, to obtain a set of solution data describing the most likely location of said selected object based upon the most likely locations of said viewing sites; and storing the solution data set to provide output data for at least a display of the extracted object.

12. The method of claim 11, wherein said acquiring step includes the step of obtaining a plurality m of substantially simultaneous different images, each of a different spatial view of the scene.

13. The method of claim 11, wherein said processing step includes the substeps of: retrieving topological structure, constraint and vertex designation data from storage; receiving information from the user to select at least one object to establish a base object frame for the object to be extracted; creating an acyclic dependency graph from a structure graph and the received constraint information; initializing unknowns in the dependency graph to form a trial solution thereof; and iteratively operating on and improving the dependency graph until a best sequentially constrained dependency graph is obtained.

14. The method of claim 13, wherein said processing step includes the step of forming said structure graph from the retrieved topological data.

15. The method of claim 13, wherein said processing step further includes the step of: interacting with the display means to allow the user to select the at least one constraint from the group consisting of: vertex point, line direction, line length and coincidence of a selected one of a vertex, line or face of a first object with a selected one of a vertex, line or face of another object.

16. The method of claim 13, wherein said processing step further includes the step of: providing to at least one object, other than the selected object, an object frame spatially situated at a location dependent upon the base object frame.

17. The method of claim 13, wherein said processing step further includes the step of: establishing the totality of constraints as a consistent whole within a set of predetermined initability conditions.

18. The method of claim 17, wherein said processing step further includes the step of: limiting the totality of constraints to cause the dependency graph to be created in a form allowing a single ordered list of scene elements to be produced.

19. The method of claim 18, wherein said processing step further includes the steps of:

creating said single ordered dement list by first presorting the scene elements into a top-down sorted first network; and following said step of presorting the scene elements, sorting said first network into a bottom-up sorted network of scene elements.

20. The method of claim 13, wherein said processing step further includes the step of: performing the iterative improvement by use of a selected one of Gauss-Newton and Levenberg-Marquardt iteration algorithms.

* * * * *